United States Patent
Brunnberg et al.

(10) Patent No.: US 9,634,859 B2
(45) Date of Patent: Apr. 25, 2017

(54) METHOD FOR DETECTING A DEFECTIVE NODE

(75) Inventors: Holger Brunnberg, Hamburg (DE); Martin Obermaier, Toulouse (FR); Darlusz Krakowski, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 923 days.

(21) Appl. No.: 12/978,859

(22) Filed: Dec. 27, 2010

(65) Prior Publication Data
US 2011/0188371 A1    Aug. 4, 2011

Related U.S. Application Data

(63) Continuation of application No. PCT/EP2009/058057, filed on Jun. 26, 2009.
(Continued)

(30) Foreign Application Priority Data

Jun. 27, 2008   (DE) .................. 10 2008 002 738

(51) Int. Cl.
*H04L 12/40*     (2006.01)
*H04L 12/24*     (2006.01)
(Continued)

(52) U.S. Cl.
CPC .. *H04L 12/40169* (2013.01); *H04L 12/40006* (2013.01); *H04L 41/0677* (2013.01);
(Continued)

(58) Field of Classification Search
CPC ......... H04L 12/40006; H04L 12/40019; H04L 12/40169; H04L 41/0677; H04L 69/40;
(Continued)

(56) References Cited

U.S. PATENT DOCUMENTS

| | | | | |
|---|---|---|---|---|
| 4,951,281 A | * | 8/1990 | Muto et al. | 370/449 |
| 2007/0018719 A1 | * | 1/2007 | Seven | 330/51 |
| 2008/0274689 A1 | * | 11/2008 | Kuban | 455/7 |

FOREIGN PATENT DOCUMENTS

| | | |
|---|---|---|
| DE | 3928537 A1 | 3/1991 |
| DE | 10131135 A1 | 1/2003 |
| DE | 102007004701 B4 | 8/2008 |
| EP | 2079190 A1 | 7/2009 |
| JP | 2002-185567 | 6/2002 |
| JP | 2002-359625 | 12/2002 |
| JP | 2004-132207 | 4/2004 |

OTHER PUBLICATIONS

Bagschik, Peter: "An Introduction to CAN" XP002541116, Feb. 8, 2000.

(Continued)

*Primary Examiner* — Ian N Moore
*Assistant Examiner* — Lakeram Jangbahadur
(74) *Attorney, Agent, or Firm* — Jenkins, Wilson, Taylor & Hunt, P.A.

(57) ABSTRACT

Method for detecting a defective node which is connected to a bus, the node incrementing an internal error counter in a normal operating state when an error is detected, and the node switching to an isolated operating state, in which the node does not exchange any messages via the bus if the internal error counter of the node exceeds a predetermined error threshold value, and the node switching from the isolated operating state to the normal operating state when a condition is fulfilled and that change in state being detected, and the node being detected as being defective if a rate of the detected state changes exceeds an adjustable change rate or a number of detected state changes exceeds an adjustable state change threshold value.

10 Claims, 3 Drawing Sheets

Related U.S. Application Data

(60) Provisional application No. 61/133,265, filed on Jun. 27, 2008.

(51) Int. Cl.
 *H04L 29/14* (2006.01)
 *H04L 12/26* (2006.01)

(52) U.S. Cl.
 CPC ........ *H04L 69/40* (2013.01); *H04L 12/40019* (2013.01); *H04L 43/16* (2013.01); *H04L 2012/4028* (2013.01); *H04L 2012/40215* (2013.01); *H04L 2012/40273* (2013.01)

(58) Field of Classification Search
 CPC . H04L 2012/40215; H04L 2012/40273; H04L 2012/4028; H04L 43/16; H04L 12/26
 See application file for complete search history.

(56) References Cited

OTHER PUBLICATIONS

German Office Action for DE 10 2008 002 738.3 dated Apr. 14, 2009.
International Search Report and Written Opinion for PCT/EP2009/058057 dated Aug. 25, 2009.
Chinese Office Action for Application No. 200980124707.0 dated Dec. 5, 2012.
Japanese Office Action for Application No. JP 2011-515403 dated Jul. 5, 2013.
European Office Action for Application No. 09 769 360.0 dated Jul. 10, 2013.

* cited by examiner

METHOD FOR DETECTING A DEFECTIVE NODE

CROSS-REFERENCE TO RELATED APPLICATIONS

This application is a continuation of PCT patent application number PCT/EP2009/058057 filed Jun. 26, 2009, which claims the benefit of and priority to U.S. Provisional Patent Application No. 61/133,265, filed Jun. 27, 2008 and German Patent Application No. 10 2008 002 738.3, filed Jun. 27, 2008, the entire disclosures of which are incorporated herein by reference.

FIELD OF THE INVENTION

The present invention relates to a method for detecting a defective node which is connected to a bus and in particular a method for detecting a defective node which is connected to a CAN bus.

DE 39 28 537 A1 describes a method for detecting or localising errors in data transmissions. There is detected a defective node which is connected to a bus. When an error is detected, an internal error counter is incremented in a normal operating state. The node switches to an isolated operating state, in which the node does not exchange any messages via the bus, if the error counter of the node exceeds a predetermined error threshold value. When a condition is fulfilled, the node switches from the isolated operating state to the normal operating state.

DE 10 2007 004 701 describes a method for operating a mixer of a heating installation, in which a state change is evaluated.

Nodes or participants of a CAN bus (CAN: Controller Area Network) communicate with each other in accordance with a CAN bus protocol. The CAN bus is an asynchronous, serial bus system for networking control devices. The number of participants or nodes connected depends on the bus driver modules used.

The CAN bus is multi-master enabled, that is to say, each individual node of the bus system is capable of initiating a communication. The CAN bus uses the access technology CSMA/CD+CR (Carrier Sense, Multiple Access/Collision Detection+Collision Resolution). Bus access is carried out by means of arbitration on the basis of identification of the messages transmitted via the bus. The communication between the nodes is carried out by messages or telegrams which are also referred to as frames. In a CAN bus, four different types of frames or messages can be transmitted. In addition to data messages for transporting messages, a distinction is also made between so-called remote frames, overload frames and error frames. A remote frame or a remote message is used to request a data frame from another participant or node. An overload frame is used as a compulsory pause between a data frame and a remote frame. An error frame signals a node of a detected error during data transmission.

A node or a CAN controller is able to detect errors during the transmission. For example, it is possible to detect bit errors, bit stuffing errors, CRC errors, format errors in a telegram and acknowledgement errors. If one of these errors is detected by a node, the node informs the remaining nodes of the bus system and the transmitter of the telegram or the message in that the node sends an error frame. After an error frame is received, all the participants or nodes evaluate the message received and also begin to send an error frame.

Defective messages may be brought about by external sources of disruption outside the bus system or by malfunction of a CAN participant. In order to ensure that the entire network or the entire bus system becomes blocked by a defective node which is not able to receive messages correctly, there is implemented in each node or each CAN controller of the bus system an algorithm, by means of which the node progressively withdraws from bus activity in the event of an error. If a CAN controller or a node detects that it is the first network participant or node to send an error frame, it increases an internal error counter TEC (Transmit Error Counter). As long as the value of the error counter remains below a threshold value, the CAN controller sends error frames in the event of an error. The threshold value for the error counter is, for example, 127. That operating mode is the normal operating state of the node and is also referred to as the error active operating state. If the value of the error counter TEC is above the threshold value of 127, the CAN controller switches to a so-called error passive operating mode. In that operating mode, the CAN controller sends a 6 bit error frame with a recessive signal level. When the error counter TEC has reached a state of 255, the CAN controller is switched to the so-called bus off operating state and no longer participates in communication via the CAN bus. In the bus off operating mode, the node is in an isolated operating state, in which the node does not exchange any messages via the bus. The CAN controller can release itself from the error passive mode because the error counter is decremented if another participant or node was first to detect an error.

FIG. 1 is a state diagram for illustrating an exception or error processing operation within a conventional CAN controller. The CAN controller has two counters, that is to say, a TEC counter (TEC: Transmitting Error Counter) and a REC counter (REC: Receiving Error Counter). The CAN node transmits and receives messages or telegrams which the node checks for correctness. In the event of an error in a transmitted message, the internal counter TEC also counts the number of detected errors so that the node can take up the states illustrated in FIG. 1. If the node is in the isolated operating state (bus off), the node does not participate in communication until a condition for switching to the normal operating state (error active) is fulfilled. The condition involves, for example, an occurrence of successive recessive bits on the data bus.

The error processing of the CAN bus data transmission protocol (error handling) illustrated in FIG. 1 ensures that a minimum of communication can take place. The error processing ensures communication of a functioning CAN bus with one or more defective nodes.

However, the error processing illustrated in FIG. 1 in accordance with the prior art has a number of disadvantages. As can be seen in FIG. 1, a defective node or a defective participant of the bus system can disrupt communication via the bus over a relatively long period of time without its defective behaviour being recorded or indicated. In the case of conventional error processing, there occurs neither evaluation of the error frequency, nor a qualitative assessment of the error occurring together with the possible consequences thereof. A constantly defective node may pass through the three operating states illustrated in FIG. 1 without its defective behaviour being detected in good time. Since no error evaluation is carried out for a constantly defective CAN bus node, that node also cannot be selectively replaced. Since a constantly defective CAN node cannot be detected immediately, there are provided additional redundant nodes, in particular in safety-critical applications. If the CAN bus is inside a vehicle, the total weight of the vehicle increases owing to the additional number of redundant nodes. Owing to the increased total weight, the fuel consumption of the vehicle increases. Constant defective behaviour of the CAN bus node may further result in failure of a device and reduce the availability of the corresponding bus system.

SUMMARY OF THE INVENTION

Therefore, an object of the present invention is to provide a method which detects a defective node of a bus in good time.

This object is achieved according to the invention by a method having the features set out in claim 1.

The invention provides a method for detecting a defective node which is connected to a bus, the node incrementing an internal error counter in a normal operating state when an error is detected,
the node switching to an isolated operating state, in which the node does not exchange any messages via the bus if the internal error counter of the node exceeds a predetermined threshold value,
the node switching from the isolated operating state to the normal operating state when a condition is fulfilled and that change in state being detected, and
the node being detected as being defective if a rate of the detected state changes exceeds an adjustable change rate or a number of detected state changes exceeds a state change threshold value.

In one embodiment of the method according to the invention, a state change counter is incremented if there is detected a state change from the isolated operating state to the normal operating state.

In one embodiment of the method according to the invention, a state change counter is provided in each node.

In an alternative embodiment of the method according to the invention, an associated state change counter for each node is provided in a master node.

In one embodiment of the method according to the invention, a node indicates to the master node a change in state from the isolated operating state to the normal operating state by means of a message sent via the bus or by means of a communication channel which is separate from the bus.

In one embodiment of the method according to the invention, the node transmits an error message via the bus when an error is detected during the transmission of a message via the bus.

The invention further provides a node for a bus having an internal error counter which is incremented when an error is detected, the node in a normal operating state switching to an isolated operating state, in which the node does not exchange any messages via the bus, if the internal error counter exceeds a predetermined counter threshold value, the node switching from the isolated operating state back into the normal operating state when a condition is fulfilled, there being provided a state change counter which is associated with the node and which is incremented in the case of each change in state of the node from the isolated operating state to the normal operating state,
the node being detected as being defective if the associated state change counter exceeds an adjustable state change threshold value.

In one embodiment of the node according to the invention, the state change counter is integrated in the node.

In an alternative form of the node according to the invention, the state change counter is integrated in a master node which is connected to the node via the bus.

In one embodiment of the node according to the invention, the node is a CAN node which is connected to a CAN bus which is installed inside a vehicle.

In one embodiment of the node according to the invention, the vehicle is an aircraft.

The invention further provides a computer program product having program commands for carrying out a method for detecting a defective node which is connected to a bus, the node in a normal operating state incrementing an internal error counter when an error is detected,
the node switching to an isolated operating state, in which the node does not exchange any messages via the bus if the internal error counter of the node exceeds a predetermined error threshold value,
the node switching from the isolated operating state to the normal operating state when a condition is fulfilled and that change in state being detected and
the node being detected as being defective if a rate of the detected state change exceeds an adjustable change rate or a number of the detected state change exceeds an adjustable state change threshold value.

The invention further provides a data carrier which stores a computer program product of that type.

BRIEF DESCRIPTION OF THE DRAWINGS

Preferred embodiments of the method according to the invention and the bus node according to the invention are described below in order to explain essential features of the invention with reference to the appended figures in which.

DESCRIPTION OF EXEMPLARY EMBODIMENTS

Figure 1:
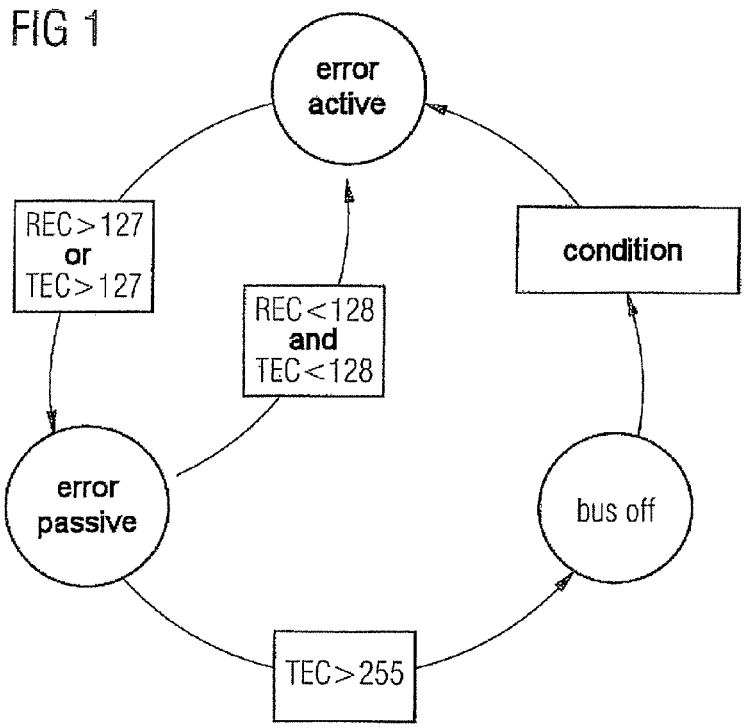
FIG. 1 is a state diagram for illustrating error processing in a CAN bus according to the prior art.
Figure 2:
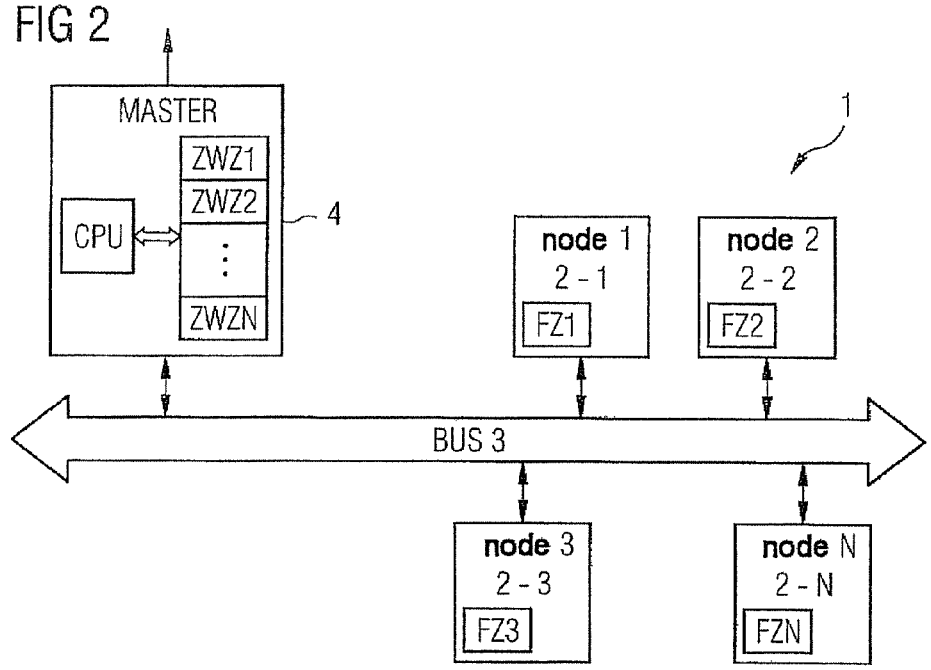
FIG. 2 is a block diagram for illustrating error processing in a first embodiment of the method according to the invention for detecting a defective node.

FIG. 2 shows a bus system 1 according to a first embodiment of the invention. A plurality of nodes 2-1, 2-1, 2-3 . . . 2n are connected to a common bus 3. There is further connected to the bus 3 at least one master node 4. The bus 3 may be, for example, a field bus, in particular a CAN bus. The nodes 2-i are formed, for example, by CAN controllers. Those CAN controllers may be integrated in any devices.

As can be seen in FIG. 2, each node has an internal error counter FZ. When the node 2 is in a normal operating state, the associated internal error counter FZ of the node is incremented when an error is detected. The error detection may be carried out at various levels. At message levels, for example, error detection is implemented by means of a CRC check sum (CRC: Cycle Redundancy Check) which is transmitted in the message. The error detection can also be provided at the physical transmission level. If an error is detected when a communication is transmitted via the bus, in one possible embodiment the node 2 transmits an error message (error frame) via the bus 3 and increments the integrated error counter FZ.

Figure 5:
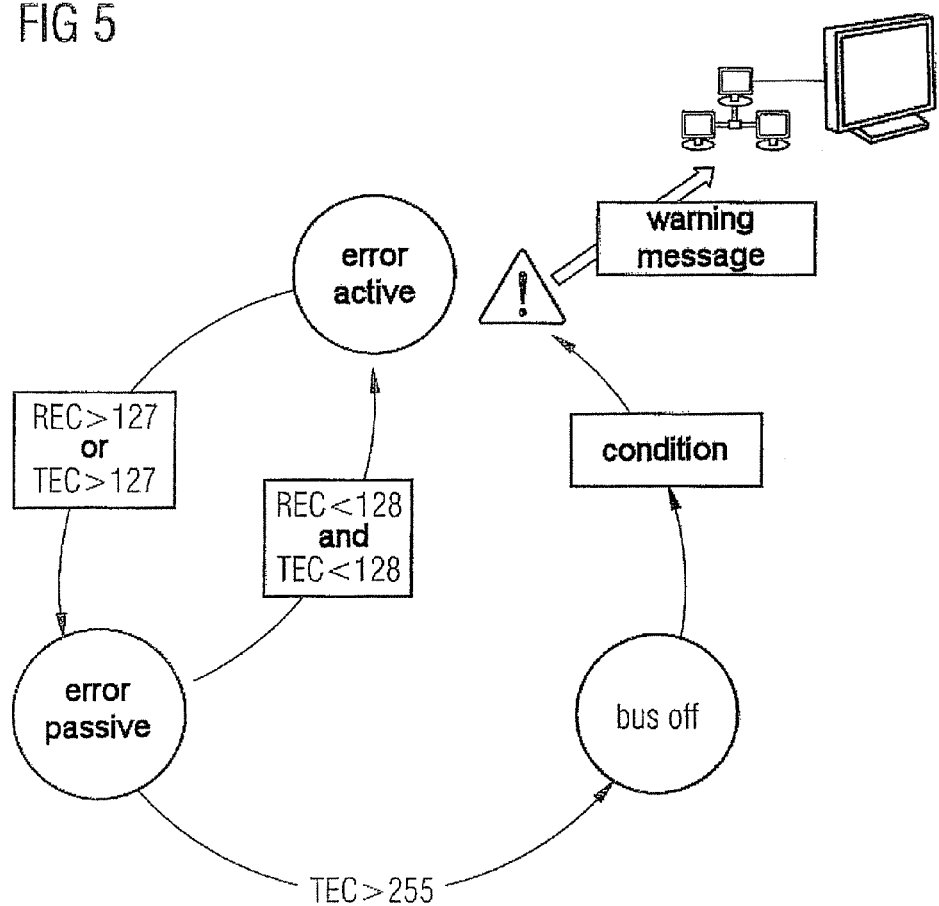
FIG. 5 is a state diagram for illustrating the method according to the invention.

If the integrated error counter FZ of the node 2 exceeds a predetermined error threshold value, the node 2 switches to an isolated operating state (bus off), in which the node 2 does not exchange any messages with other nodes via the bus 3, as illustrated in FIG. 5. In one possible embodiment, the error threshold value is predetermined and is, for example, 255 in a CAN bus. In an alternative embodiment, the error threshold value can be adjusted. The threshold values for the different nodes can be adjusted so as to be identical or different depending on the application. In another embodiment, the threshold values for the error counters FZ of the different nodes 2 are adjusted by the master node 4 via the bus 2 in that a corresponding message is transmitted from the master node 4 to the respective node 2. In another embodiment, the threshold value for the error counter FZ can be adjusted directly at the respective node 2 via an interface.

After the error threshold value has been exceeded, the respective node no longer participates in the communication and is in an isolated operating state. A node 2 which is in the isolated operating state (bus off) does not participate in communication until a condition for the transition or the change in state from the isolated operating state to the normal operating state (error active) is fulfilled. That change in state, in which the node or participant changes or switches from the isolated operating state back into the normal operating state, is detected in the method according to the invention. If a defective node 2 repeatedly moves from the isolated operating state back into a normal operating state, this is detected in the method according to the invention. This can also be detected by other nodes if the causal node 2 is structurally not in a position to indicate that information or to forward it to other nodes.

In the method according to the invention, a node 2 is detected as being defective if a rate of detected state changes exceeds an adjustable change rate. In an alternative embodiment of the method according to the invention, a node 2 is detected as being defective if an absolute number of the detected state changes exceeds an adjustable state change threshold value. To that end, in one embodiment of the method according to the invention there is provided for each node 2 to be monitored an associated state change counter ZWZ. That state change counter ZWZ can be implemented, for example, in a master node 4, as in the embodiment illustrated in FIG. 2. As can be seen in FIG. 2, the master node 4 contains a plurality of registers or counting mechanisms, there being provided an associated state change counter ZWZ for each of the N nodes 2 to be monitored of the bus system 1. A state change counter ZWZ of a node 2 is incremented if a state change of the node 2 from an isolated operating state to the normal operating state is detected. The count values of the state change counter ZWZ or BOC counter (BOC: Bus Off Counter) can be read out and evaluated by a CPU or a microprocessor inside the master node 4. To that end, in one possible embodiment the CPU of the master node 4 carries out a corresponding error processing computer program. In one possible embodiment, a node 2 indicates to the master node 4 a change in state from the isolated operating state to the normal operating state by a message sent via the bus 3. In one possible embodiment, a message is used in accordance with the bus message signal transmission protocol. If, for example, the bus 3 is a CAN bus, the node 2 may indicate the occurrence of the change in state by means of a bit or a flag within a CAN message. A bit which is normally not set within the message is set by the node 2 when a change in state is detected and indicates to the master node 4 the change in state which has occurred in the node 2 in the form of a flag.

Figure 3:
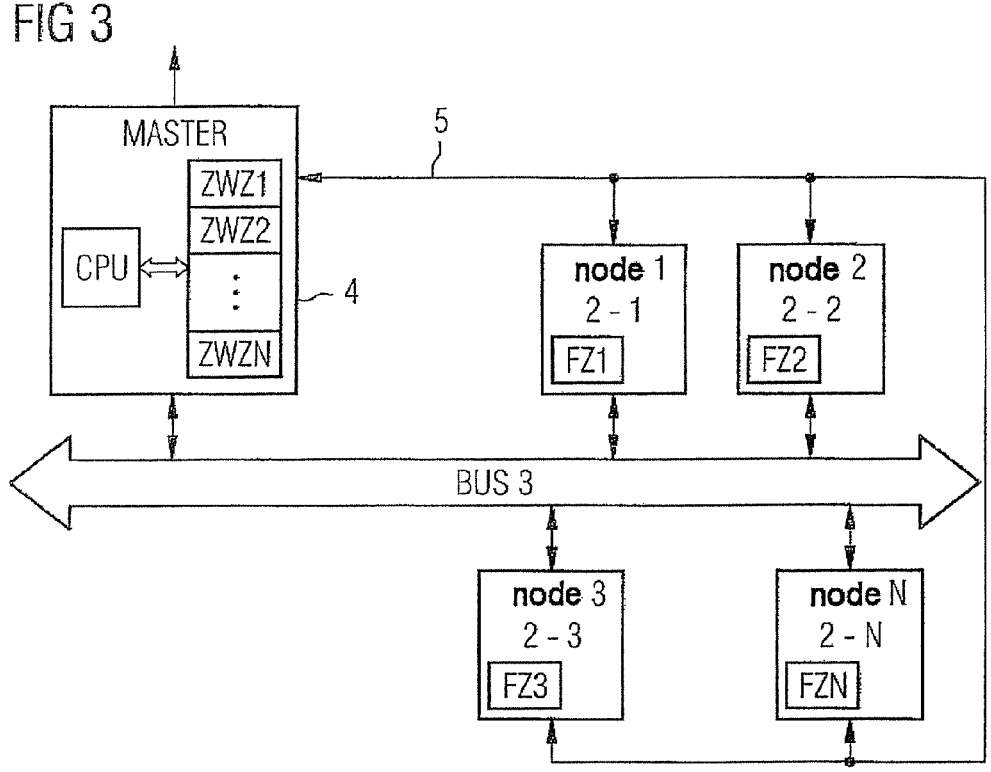
FIG. 3 is a block diagram for illustrating error processing in another embodiment of the method according to the invention for detecting a defective node.

In an alternative embodiment, the change in state is not indicated by means of a message sent via the bus 3 but instead via a separate communication channel 5. FIG. 3 shows an embodiment in which the nodes 2 are connected to the master node 4 via a communication connection 5 which is separate from the bus 3. The nodes 2 are in a position to indicate to the master node 4, via a control line 5 which is wired separately from the bus, the fact that a change in state from the isolated operating state to the normal operating state has occurred in them. The separate communication channel 5 may also be another bus or field bus. In the embodiment illustrated in FIG. 3 the communication channel 5 is wired. In an alternative embodiment, the communication channel 5 may also be implemented so as to be wireless. In this case the nodes 2 transmit to the master node 4, via a wireless interface, a message which says that a change in state has occurred in the respective node 2. In the embodiments illustrated in FIGS. 2 and 3, the state change counters ZWZ are implemented in a master node 4 and are evaluated therein.

Figure 4:
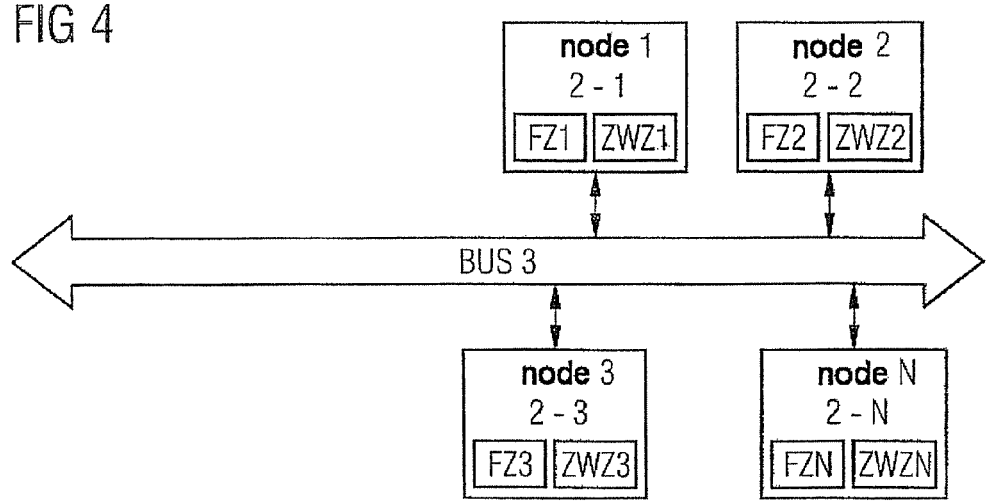
FIG. 4 is a block diagram for illustrating error processing in another embodiment of the method according to the invention for detecting a defective node.

In the embodiment illustrated in FIG. 4, the state change counters ZWZ of the various nodes 2 are implemented within the nodes 2. A node 2 is detected as being defective if its state change counter ZWZ integrated therein exceeds an adjustable state change threshold value. Not until that state change threshold value is exceeded does the node 2 transmit a corresponding message via the bus 3 in order, for example, to inform a user about a necessary maintenance operation, as shown in FIG. 5. In the embodiment illustrated in FIG. 4, all the nodes 2 have equal access.

In the embodiment illustrated in FIG. 4, it is also possible for the nodes 2 to indicate that the state change threshold value thereof has been exceeded via a separate communication channel which is wired separately from the bus 3. In an alternative embodiment, the nodes 2-$i$ report that the state change counter ZWZ integrated therein has been exceeded via a wireless interface. The signal transmitted via the separate communication channel 5 may be digital, analogue or discrete. In one possible embodiment, the various changes in state occurring are not only counted but are also recorded for subsequent evaluation. The recording may be carried out by storing the count values of the state change counters ZWZ at different times. To that end, in one possible embodiment the nodes 2-$i$ have a readable memory, in which the state change count values are recorded over time. In one possible embodiment, those recorded values may be read out in a corresponding exchange of messages via the bus 3. In an alternative embodiment, the recorded values are read out via a separate communication channel. In another embodiment, the recorded values are stored in a local data carrier which can be removed from the node 2.

If the transmission quality of a node 2 deteriorates owing to an error, the state change rate thereof increases. The value of the responsible state change counter ZWZ of the respective node 2 thereby increases. If the state change counter ZWZ of the node 2 exceeds the configured state change threshold value for that node 2, the master node 4 illustrated in FIG. 2 can, for example, transmit maintenance information or an alarm message which indicates the defective node 2. That maintenance message or information can be transmitted to a remote maintenance server via a network. The network may be a network which is wired or wireless.

It is possible, owing to the continuous recording of a bus protocol error, to clearly identify the occurrence of an error or of a defective node 2.

The method according to the invention allows early detection of sources of malfunctions in the bus system 1 without the sources having to be restricted functionally or having to be completely switched off. Consequently, it is possible for the bus system 1 to continue to operate in an unrestricted manner in spite of an error being reported. Furthermore, a corresponding maintenance operation can be planned and carried out in a targeted manner.

Owing to the early detection of potentially defective nodes, it is possible to reduce the number of redundant nodes 2 in safety-critical applications. If the bus system is fitted in a vehicle, the weight of the vehicle is thereby reduced.

Owing to the early detection of a defective CAN bus participant or a node 2 and the early repair or replacement thereof, the availability of the bus system 1 is increased. Consequently, it is possible to prevent device failures which are caused by defective behaviour of a node 1. Maintenance operations are substantially simplified and accelerated by means of the method according to the invention in the event of defective behaviour of devices.

What is claimed is:

1. A method for detecting a defective node which is connected to a bus, comprising:
   incrementing, by a node, an internal error counter in a normal operating state of the node when an error is detected,
   switching the node to an isolated operating state of the node, in which the node does not exchange any messages via the bus if the internal error counter of the node exceeds a predetermined error threshold value,
   switching the node from the isolated operating state to the normal operating state when a condition is fulfilled,
   detecting the switching of the node from the isolated operating state to the normal operating state as state change,
   wherein detecting the switching of the node from the isolated operating state to the normal operating state as state change comprises incrementing a state change counter if a state change of the node from the isolated operating state to the normal operating state is detected; and
   detecting the node as being defective if a rate of the detected state changes exceeds an adjustable change rate or a number of detected state changes exceeds an adjustable state change threshold value.

2. The method according to claim 1, wherein a state change counter is provided in each node.

3. The method according to claim 1, wherein an associated state change counter for each node is provided in a master node.

4. The method according to claim 3, further comprising:
   indicating, by the node, to a master node a change in state from the isolated operating state to the normal operating state by a message sent via the bus or by a communication channel which is separate from the bus.

5. The method according to claim 4, further comprising transmitting, by the node, an error message via the bus when an error is detected during the transmission of the message via the bus.

6. A node for a bus:
   the node having an internal error counter which is incremented when an error is detected,
   the node being configured to switch from a normal operating state to an isolated operating state if the internal error counter exceeds a predetermined error threshold value,
   the node being configured to switch from the isolated operating state back into the normal operating state when a condition is fulfilled,
   wherein the node comprises:
   a state change counter which is associated with the node and which is configured to be incremented in the case of each change in state of the node from the isolated operating state to the normal operating state, and
   the node being detected as being defective if the associated state change counter exceeds an adjustable state change threshold value.

7. The node according to claim 6, wherein the state change counter is integrated in the node or is integrated in a master node which is connected to the node via the bus.

8. The node according to claim 6, wherein the node is a CAN node which is connected to a CAN bus which is provided inside a vehicle.

9. The node according to claim 8, wherein the vehicle is an aircraft.

10. A method for detecting a defective node which is connected to a bus, the method comprising:
    incrementing, by a CAN node, an internal error counter in a normal operating state of the CAN node when an error is detected,
    switching the CAN node to an isolated operating state of the CAN node, in which the CAN node does not exchange any messages via the CAN bus if the internal error counter of the CAN node exceeds a predetermined error threshold value,
    switching the CAN node from the isolated operating state to the normal operating state when a condition is fulfilled,
    detecting the switching of the CAN node from the isolated operating state to the normal operating state as state change, wherein an associated state change counter for each CAN node is provided in a master node,
    detecting the CAN node as being defective if a rate of the detected state changes exceeds an adjustable change rate or a number of detected state changes exceeds an adjustable state change threshold value,
    indicating, by the CAN node, to a master node a change in state from the isolated operating state to the normal operating state by a message sent via the CAN bus or by a communication channel which is separate from the CAN bus, and
    transmitting, by the CAN node, an error message via the CAN bus when an error is detected during the transmission of the message via the CAN bus.

* * * * *